Nov. 29, 1966 W. R. JOHNSON 3,288,930

WIDE-BAND SIGNAL-TRANSLATING CHANNEL

Filed Nov. 12, 1964 3 Sheets-Sheet 1

Nov. 29, 1966 W. R. JOHNSON 3,288,930

WIDE-BAND SIGNAL-TRANSLATING CHANNEL

Filed Nov. 12, 1964 3 Sheets-Sheet 3

United States Patent Office 3,288,930
Patented Nov. 29, 1966

3,288,930

WIDE-BAND SIGNAL-TRANSLATING CHANNEL

Wayne R. Johnson, Woodland Hills, Calif., assignor to Winston Research Corporation, a corporation of California Filed Nov. 12, 1964, Ser. No. 410,529
8 Claims. (Cl. 179—1)

This invention relates to wide-band signal-translating channels and particularly to such channels for translating signals comprising a wide band of frequencies but subject to undesired broad-spectrum noise resulting in relatively low signal-to-noise ratios and including provisions of minimizing the effect of such noise in the channel.

This application is a continuation-in-part of applicant's copending application Serial No. 280,853, filed May 16, 1963, and entitled "Noise Reducing System."

While the signal-translating channel of the invention is of general application, it is particularly useful in wide-band systems in which large-amplitude signals may cause overloading of some portions of the system, for example in magnetic tape transducing systems and in frequency-modulation carrier systems.

In such wide-band signal-translating channels, particularly if operating at relatively low signal-to-noise ratios, it has become the practice to include at the transmitter or signal originating station a pre-emphasis circuit to translate the higher-frequency components of the signal with progressively increasing gains to improve their signal-to-noise ratio since, in the usual wide-band signals, the amplitudes of the high-frequency components progressively decrease with frequency and thus tend to become submerged in background noise. Such a circuit is commonly referred to as a pre-emphasis or noise-reducing network. In such a system it is also the practice to include at the signal-receiving or signal-reproducing station a complementary de-emphasis circuit to restore the signal components to their original relative amplitudes and thus to preserve the fidelity of the translated program.

The prior pre-emphasis–de-emphasis channels described are, however, subject to the characteristic that, if the signal includes large-amplitude high-frequency components, such components, upon pre-emphasis, may have such amplitudes as to overload one or more of the stages of the channel. For example, in video signal-generating system, the signal developed during the transit of the scanning beam across a boundary between a very dark area and a very light area comprises essentially a step function having a steep wave front, which includes high-frequency components of large amplitudes. If such a signal is applied, for example, to a wide-band magnetic tape system including a conventional pre-emphasis circuit, such high-amplitude high-frequency signal components overload the recording transducer, resulting in distortion of the program. Likewise, in frequency-modulation signal generators, such high-amplitude high-frequency components of the signal may result in over-modulation of the carrier, with consequent distortion of the program.

It is an object of the invention therefore, to provide a new and improved wide-band signal-translating channel of the type described which obviates the above-mentioned limitation of prior systems of this type.

It is anoher object of the invention to provide a new and improved wide-band signal-translating channel in which the higher-frequency components of the signal are repeated with progressively enhanced amplitudes relative to the low-frequency components to achieve an improved signal-to-noise ratio while, at he same time, avoiding overloading of the subsequent stages of the channel and preserving the fidelity of transmission of the signal.

In accordance with the invention, there is provided a wide-band signal-translating channel subject to undesired broad-spectrum noise comprising in cascade, in the order named, an input circuit for supplying a signal within a given amplitude range comprising components within a wide band of frequencies, a pre-emphasis circuit coupled to the input circuit and having a frequency-response characteristic accentuating the components of a translated signal as a continuous direct function of their frequencies, and a signal-attenuating circuit coupled to the pre-emphasis circuit and having a nonlinear amplitude-response characteristic over the amplitude range as modified by the pre-emphasis circuit accentuating attenuation of high-frequency signals of high amplitude. The channel further comprises a frequency-discriminating signal-translating circuit coupled to the attenuating circuit having a nonlinear amplitude-response characteristic over the amplitude range of the signals applied thereto accentuating high-frequency signals of high amplitude and a de-emphasis circuit coupled to the frequency-discriminating circuit having a frequency-response characteristic which is substantially a continuous inverse function of frequency. The term "coupled," as used herein and in the appended claims, is intended to include active or passive coupling devices, direct or indirect, as through a radio link.

Further in accordance with the invention, there is provided a wide-band signal-translating channel subject to undesired broad-spectrum noise comprising an input circuit for supplying a signal within a given amplitude range comprising components within a wide band of frequencies, a pre-emphasis circuit coupled to the input circuit and having a frequency-response characteristic accentuating the high-frequency components of a translated signal including a serially connected capacitance arm followed by a shunt-connected resistance arm, and a signal-attenuating circuit coupled to the pre-emphasis circuit across the signal-translating channel and including serially connected capacitance means and unbiased resistance means, the capacitance means having a reactance at the lower frequencies of the band substantially higher than the shunt impedance of the pre-emphasis circuit across the channel, one of such means having an impedance varying in value with the voltage applied thereto over the amplitude range as modified by the pre-emphasis circuit.

Further in accordance with the invention, there is provided a wide-band signal-translating channel subject to undesired broad-spectrum noise and comprising an input circuit for supplying a signal within a given amplitude range comprising components within a wide band of frequencies, a frequency-discriminating signal-translating circuit coupled across the signal-translating channel, having a nonlinear amplitude-response characteristic over the amplitude range accentuating high-frequency signals of high amplitude and including serially connected capacitance means and unbiased resistance means, the capacitance means having a reactance at the lower frequencies of the band substantially higher than the shunt impedance of the pre-emphasis circuit across the channel, one of such means having an impedance varying in value with the voltage applied thereto over the amplitude range, and a de-emphasis circuit coupled to the frequency-discriminating circuit and having a frequency-response characteristic which is substantially a continuous inverse function of frequency and including a serially connected resistance arm followed by a shunt-connected capacitance arm.

For a better understanding of the present invention, together with other and further objects thereof, reference is had to the following description, taken in connection with he accompanying drawings, while its scope will be pointed out in the appended claims.

Referring now to the drawings.

Figure 2:
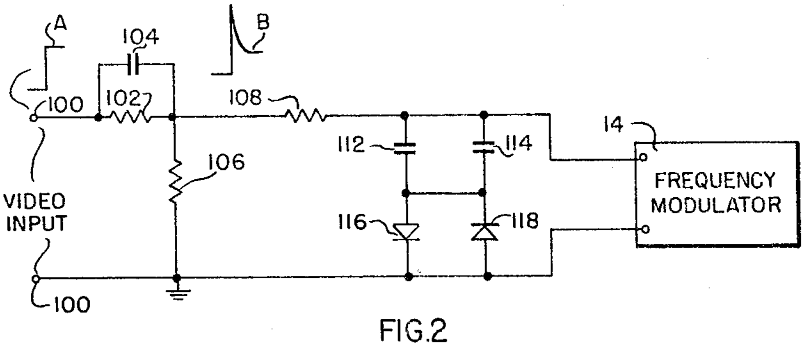
FIG. 2 is a circuit diagram of a pre-emphasis circuit and signal-attenuating circuit in accordance with the invention cooperating to improve the signal-to-noise ratio of the high-frequency components of the signal, which may be termed a noise-reducing network.
Figure 3A:
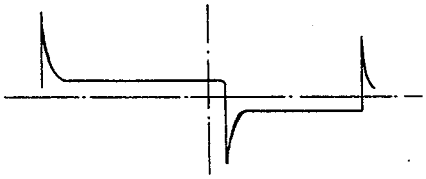
Figure 3B:
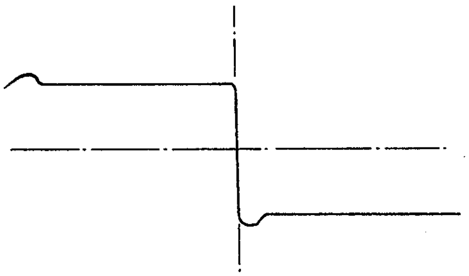
Figure 4:
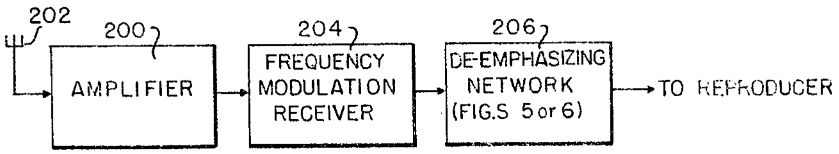
Figure 5:
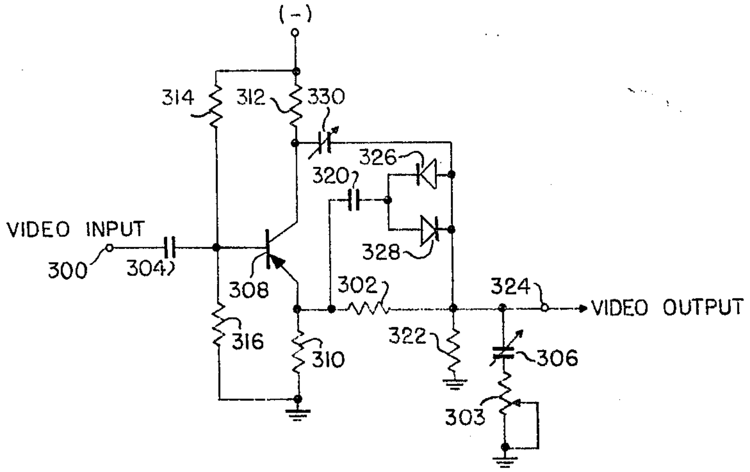
Figure 6:
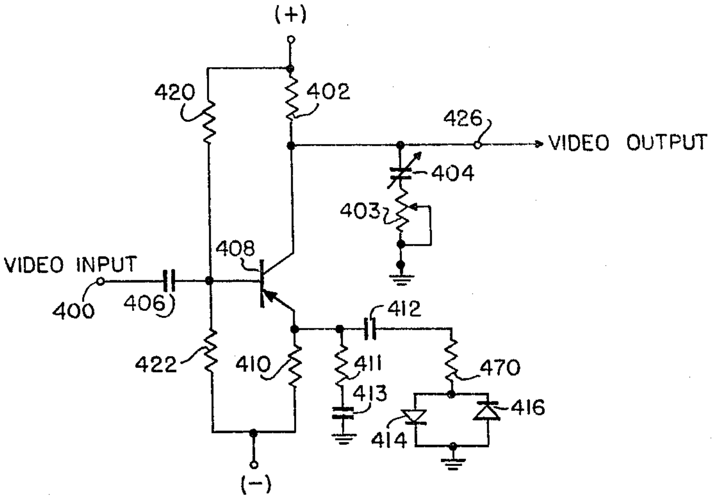
Figure 7:
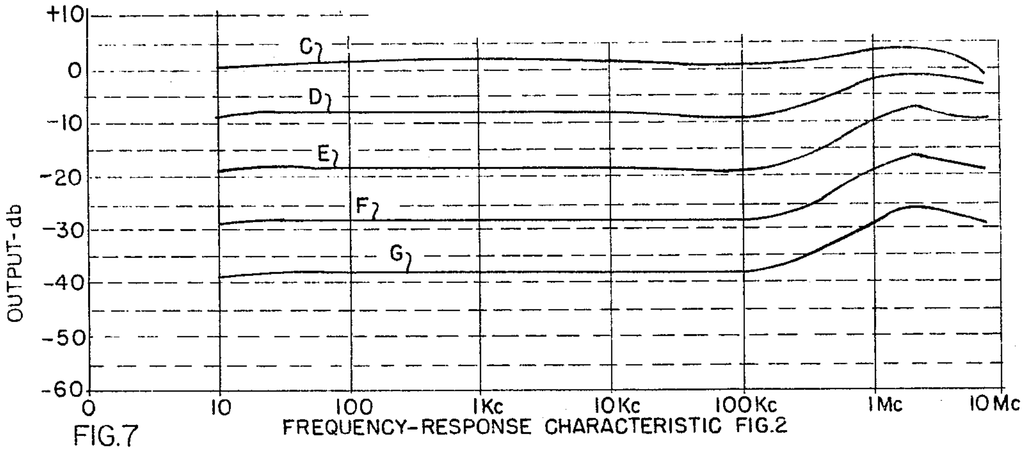
Figure 8:
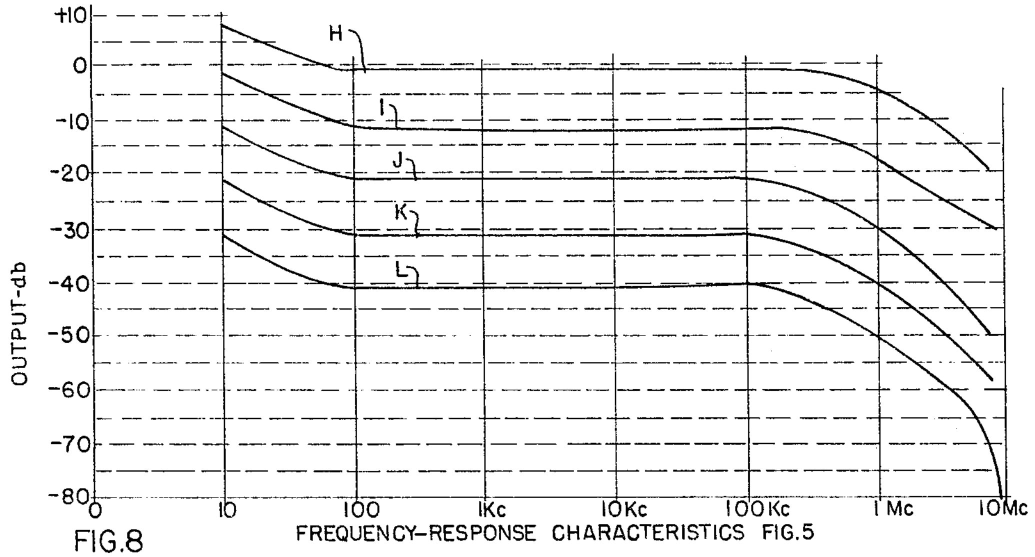
Figure 9:
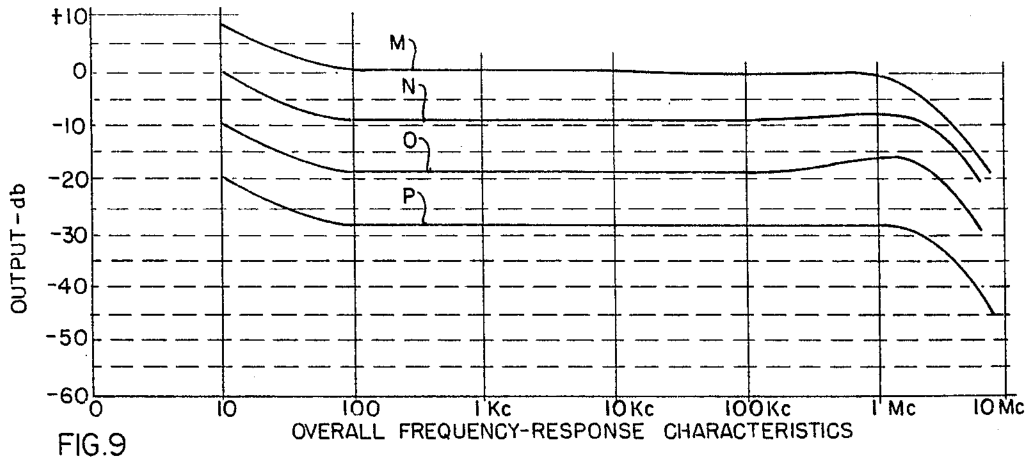

FIGS. 3*a* and 3*b* are curves illustrating certain characteristics of the circuit of FIG. 2;

FIG. 4 is a schematic block diagram of a signal receiver including the wide-band signal-translating channel of the invention and incoporating a network generally complementary to the noise-reducing network of FIG. 2;

FIGS. 5 and 6 are circuit diagrams of networks including a frequency-discriminating circuit and a de-emphasis circuit generally complementary to the noise-reducing network of FIG. 2; while FIGS. 7, 8, and 9 are curves representing operating characteristics of apparatus embodying the circuits of FIGS. 2 and 5, both alone and in combination.

Figure 1:
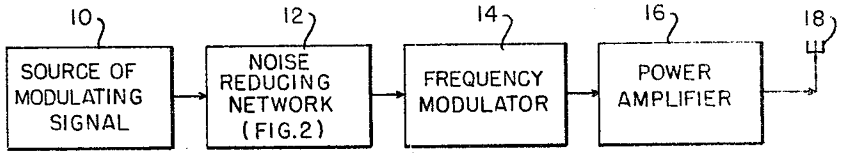
FIG. 1 is a schematic block diagram of a frequency-modulation transmitter including a wide-band signal-translating channel in accordance with the invention.

Referring now specifically to FIG. 1, there is illustrated schematically one appropriate embodiment of the present invention, namely, a basic frequency-modulation transmitter including a source 10 of modulating signals which may be, for example, video signals extending through a relatively wide range of frequencies. The source 10 is coupled to a noise-reducing network 12 which effects a high-frequency pre-emphasis operation, as described hereinafter. The network 12 is, in turn, coupled to a conventional frequency modulator 14 in which the processed signal output of the network 12 is modulated upon a carrier wave. The resulting frequency-modulated signal from the modulator 14 is applied to a power amplifier 16 wherein it is amplified and impressed upon an antenna 18 for radiation.

Referring now to FIG. 2 of the drawings, there is represented a wide-band signal-translating channel embodying the invention for translating signals subject to undesired broad-spectrum noise comprising a video input circuit including input terminals 100, 100 for supplying a signal comprising components within a wide band of frequencies. There is coupled to the input circuit a pre-emphasis circuit having a frequency-response characteristic accentuating the components of a translated signal as a continuous and direct function of their frequencies. This pre-emphasis circuit includes a serially connected capacitance arm comprising capacitor 104 followed by a shunt-connected resistance arm consisting of a resistor 106. The characteristic of the pre-emphasis circuit may be somewhat modified by connecting a resistor 102 in parallel to the capacitor 104.

The signal-translating channel further includes a signal-attenuating circuit coupled to the pre-emphasis circuit and having a nonlinear amplitude-response characteristic accentuating attenuation of high-frequency signals of high amplitude. Specifically, this signal-attenuating circuit includes serially connected capacitance means such as the capacitors 112 and 114 connected in parallel and resistance means, one of the means, specifically the resistance means, varying in value with the voltage applied thereto. Specifically, the voltage-variable resistance means comprises a pair of diode devices 116, 118 connected in parallel with opposite polarity, the two being connected in series with the capacitors 112, 114, the series combination being connected across resistor 106 through series buffer resistor 108. The diode devices 116, 118 are shown as of the semiconductor type but vacuum tube diodes may be used if desired. The output of the noise-reducing network of FIG. 2 is connected to the frequency modulator 14, as in the circuit of FIG. 1.

In describing the operation of the noise-reducing network of FIG. 2, it will be assumed that a signal represented by Curve A is applied to the channel, such a signal corresponding to a video signal developed by scanning a scene across a boundary between a very dark area and a very light area which develops a step-function signal. Such a signal may be analyzed in terms of a large number of components of progressively increasing frequency and progressively decreasing amplitude although the high-frequency components are of much greater amplitude than usual video signals. The low-amplitude high-frequency components of such a signal tend to become submerged in the broad-spectrum noise developed in the several stages of the signal-translating channel. However, the series combination of the capacitor 104 and resistor 106 is effectively a differentiating circuit which emphapsizes the amplitudes of the high-frequency components appearing across the resistor 106 approximately proportionally to their frequencies and thus raises them above the noise level occurring in subsequent stages of the channel. The resistor 102, shunted across capacitor 104, is effective to modify the response of the pre-emphasis circuit to increase the response at the low-frequency end of the frequency band, which would otherwise drop off substantially to zero.

Neglecting for the moment the nonlinear circuit elements 112, 114, 116, and 118, the result of the differentiation of the signal of Curve A is to develop across resistor 106 a voltage represented by Curve B. In FIG. 3*a* is represented the voltage across resistor 106, assuming that the step function of Curve A is followed by a second step function of opposite polarity which may correspond to a video signal during the scanning of a boundary between a dark area and a light area in the opposite sense. The peak value of the signal represented by Curve B and FIG. 3*a* may well be sufficient to overload subsequent stages of the signal-translating channel.

However, the nonlinear shunting or attenuating circuit comprising the capacitors 112 and 114 in series with the diode devices 116 and 118 has a nonlinear amplitude-response characteristic which accentuates the attenuation of high-frequency signals of high amplitude. This characteristic is due to the nonlinear resistance of the diode devices 116, 118, such resistance being very high for low applied voltages and decreasing approximately as the square root of the applied voltage. Thus, for signals of low and moderate amplitude, comprising the usual wide-band signal, the resistances of the diode devices 116 and 118 are so high that a negligible amount of the signal is by-passed through them and there is a minimum of attenuation of the signal. However, upon the occurrence of a signal comprising a step function or a steep wave front, such as Curve A, the peak amplitudes of the high-frequency components of the emphasized signal, represented by Curve B, are such as to raise the voltage across the diode devices 116 and 118 to a value such that their resistance is substantially decreased and a substantial portion of the signal is by-passed therethrough, thus attenuating such high-frequency signal components. At the same time, the low-frequency high-amplitude signal compoments are not significantly attenuated because of the high impedance of the capacitors 112, 114 at such low frequencies.

The signal of FIG. 3*a*, as thus attenuated, is represented in FIG. 3*b* which, it is seen, substantially reduces the peak amplitude of the emphasized step-function signal while, at the same time, the high-frequency components of the wide-band signal, which are normally of relatively low amplitudes, are increased roughly proportional to their frequencies by the pre-emphasis circuit comprising capacitor 104 and resistor 106. The signal of curve 3*b* may then be utilized as a modulating signal in the modulator 14 or as a recording signal in a magnetic tape transducer system.

It will be appreciated, however, that the signal output of the noise-reducing network of FIG. 2 is considerably distorted with respect to the original signal. Therefore, in accordance with the invention, there is provided, at a receiving or signal-reproducing station, a network having characteristics generally complementary to those of the network of FIG. 2.

Referring now to FIG. 4, there is represented in schematic block form a frequency-modulation receiver including a de-emphasis network embodying a feature of the invention. Specifically, the receiver of FIG. 4 includes a receiving antenna 202, an amplifier 200, a frequency-modulation receiver 204, and a de-emphasizing network 206 the output of which may be connected to a suitable signal reproducer. The de-emphasizing network 206 may take the form of either FIG. 5 or FIG. 6.

Referring specifically to the de-emphasizing network of FIG. 5, there is shown a video input circuit comprising a terminal 300, the other side of which is assumed to be grounded, which is coupled to the signal-attenuating circuit 112, 114, 116, 118 of FIG. 2 via the transmitter of FIG. 1, the radio link, and the receiver of FIG. 4. The de-emphasizing network includes a frequency-discriminating signal-translating circuit coupled to the input terminal 300 and across the signal-translating channel and having a nonlinear amplitude-response characteristic accentuating high-frequency signals of high amplitude, that is, one substantially complementary to that of the signal-attenuating circuit 112, 114, 116, and 118 of FIG. 2. This frequency-discriminating circuit includes serially connected capacitance means and resistance means, specifically a capacitor 320 in series with a pair of diode devices 326, 328 connected in parallel with opposite polarity and connected across a resistor 302 forming with resistor 322 a voltage-divider. The diode devices 326, 328 comprises resistance means having resistances varying in value with the voltage applied thereto.

This frequency-discriminating circuit is coupled to the input terminal 300 by way of a coupling capacitor 304 and a transistor 308 connected as an emitter-follower with an emitter load resistor 310 and a collector load resistor 312. Resistors 314 and 316 are connected across the source, their junction being connected to the base of transistor 308 to provide suitable bias. A neutralizing capacitor 330 is included in a feedback path from load resistor 312 to the emitter of transistor 308 through resistor 302 for neutralizing the capacitance of the diodes 326, 328.

While the frequency-discriminating circuit 302, 320, 322, 326, 328 is shown as coupled to the input circuit including terminal 300 through the transistor signal repeater 308 which is effective to minimize interaction between these two circuits, in certain applications the transistor 308 may be omitted and the frequency-discriminating circuit connected directly to the capacitor 304.

The de-emphasis network of FIG. 5 further includes a de-emphasis circuit connected across the signal-translating channel and having a frequency-response characteristic which is substantially a continuous inverse function of frequency, that is, substantially complementary to that of the pre-emphasis circuit 102, 104, 106 of FIG. 1. Specifically, the de-emphasis circuit is connected across the load resistor 322 and includes a serially connected resistance arm, such as resistor 302, followed by a shunt-connected capacitance arm, such as capacitor 306, in series with an adjustable resistor 303 of relatively small value to prevent the response of the network from approaching zero with respect to the translated signal components of highest frequencies. The de-emphasized signal across capacitor 306 is applied to video output terminal 324.

It is believed that the operation of the de-emphasizing network of FIG. 5 will be apparent in the light of the foregoing description. Briefly, the pre-emphasized signal with attenuated high-amplitude high-frequency components is applied to the input terminal 300 and, since the high-amplitude high-frequency components have been attenuated in the attenuating circuit 112, 114, 116, 118 of FIG. 2, it becomes necessary selectively to accentuate these signals to restore the signal to its original form. This selective accentuation of the high-amplitude high-frequency components is effected by the frequency-discriminating circuit comprising capacitor 320 and diode devices 326, 328, which for high-amplitude signals have a relatively low resistance, by-passing such signal components around resistor 302 and, therefore, accentuating the corresponding signal component voltages developed across the output resistor 322.

Thereafter, the high-frequency components are de-emphasized in the circuit comprising series resistor 302 and shunt capacitor 306 complementarily to their pre-emphasis in the circuit 102, 104, 106 of FIG. 2. The result is that the signal represented by FIG. 3*b*, which is the output of the noise-reducing network of FIG. 2, is restored to the form of Curve A of FIG. 2; that is, all of the components of the signal are restored to their original relative amplitudes to preserve the fidelity of the signal.

In FIG. 6 is represented a modified high-amplitude high-frequency equalizing network in which the signal accentuating circuit is connected across a degenerative transistor emitter resistor. Thus, the video input signal is applied to a terminal 400 which is connected through a coupling capacitor 406 to the base of a transistor 408 having a collector load resistor 402 and a degenerative emitter resistor 410. The base of transistor 408 is maintained at a suitable bias by way of a voltage-divider comprising resistors 420 and 422 connected in series across the source. The video output across load resistor 402 is applied to output terminal 426. A shaping circuit comprising a resistor 411 in series with a capacitor 413 is connected across resistor 410. The high-amplitude high-frequency accentuating circuit comprises a capacitor 412 in series with diode devices 414 and 416 connected in parallel with opposed polarity, the series combination being connected in shunt to the emitter degenerative resistor 410. The de-emphasis circuit having a response complementary to the pre-emphasis circuit of FIG. 2 comprises the series load resistor 402 and the shunt capacitor 404 connected in series with adjustable resistor 403 to limit the maximum de-emphasis at the higher frequencies.

The operation of the equalizing network of FIG. 6 is similar to that of FIG. 5 described above except that the signal-accentuating circuit acts to control the degeneration of the transistor stage. Specifically, for low-amplitude high-frequency components, the resistances of the diode devices 414 and 416 are relatively high so that this circuit has a minimum effect on the normal signal translation by the stage. Howeger, high-amplitude high-frequency components are substantially by-passed around the resistor 410, decreasing the degeneration of the stage and thus increasing the relative gain. As a result of this action and the de-emphasis effected by the series resistor 402 and shunt capacitor 404, the video output at the terminal 426 is again restored substantially to the same form as the input, e.g., as represented by Curve A of FIG. 2.

While the values of the various circuit elements of the signal-translating channel embodying the present invention may be varied within wide limits in accordance with the parameters of the system in which the channel is embodied, there follow the circuit constants of the noise-reducing network of FIG. 2 and the de-emphasizing networks of FIGS. 5 and 6 which have been found satisfactory for use in a magnetic tape recording/reproducing system translating a video signal of a bandwidth of approximately 4 Mc:

FIG. 2

| | | |
|---|---|---|
| Resistor **102** | kilohms | 1 |
| Resistor **106** | ohms | 120 |
| Resistor **108** | do | 1000 |
| Capacitor **104** | $\mu\mu$f | 560 |
| Capacitor **112** | $\mu\mu$f | 255 |
| Capacitor **114** | $\mu\mu$f | 255 |
| Diode devices **116, 118** | | Type 1N295 |

FIG. 5

| | | |
|---|---|---|
| Resistor 302 | kilohms | 15 |
| Resistor 303 | kilohms—max | 1 |
| Resistor 310 | kilohms | 2.7 |
| Resistor 312 | do | 1.5 |
| Resistor 322 | do | 1.5 |
| Capacitor 306 | μμf | 200–600 |
| Capacitor 320 | μμf | 390 |
| Capacitor 330 | μμf | 1.5 to 10 |
| Diode devices 326, 328 | | Type 1N295 |
| Transistor 308 | | Type 2N2904 |

FIG. 6

| | | |
|---|---|---|
| Resistor 402 | kilohms | 1.5 |
| Resistor 403 | kilohms—max | 1 |
| Resistor 410 | kilohms | 4.7 |
| Resistor 411 | do | 2.7 |
| Resistor 420 | do | 27 |
| Resistor 422 | do | 10 |
| Capacitor 404 | μμf | 200–600 |
| Capacitor 406 | μf | 100 |
| Capacitor 412 | μμf | 390 |
| Capacitor 413 | μf | 100 |
| Diode devices 414, 416 | | Type 1N295 |
| Transistor 408 | | Type 2N2904 |

Referring to FIGS. 7, 8, and 9, there are represented frequency-response characteristics realized from apparatus embodying respectively the circuit of FIG. 2, the circuit of FIG. 5, and the circuits of FIGS. 2 and 5 in combination, in each case embodying the circuit constants of the foregoing table. In FIG. 7, Curves C to G represent the frequency-response characteristics of the pre-emphasis circuit of FIG. 2 for input signals varying over the range of −10 db to −50 db in steps of 10 db. It is seen clearly that, as the signal input level rises, the pre-emphasis of the high-frequency components progressively decreases, thus avoiding overloading in subsequent stages of the system while, at the same time, raising the signal-to-noise ratio of the output of the pre-emphasis circuit.

In FIG. 8, Curves H to L represent the frequency-response characteristic of the de-emphasis circuit of FIG. 5 for input signals varying over the range of 0 db to −40 db in steps of 10 db. These curves illustrate the fact that, as the signal input level rises, the de-emphasis of the high-frequency components progressively decreases in correlation with the progressive decrease in the pre-emphasis of the signal of the circuit of FIG. 2.

In FIG. 9, Curves M to P represent the over-all frequency-response characteristic of apparatus including the circuit of FIG. 2 coupled to apparatus including the circuit of FIG. 5 for signal inputs varying over the range of −10 db to −50 db. It is noted that the over-all frequency response does not vary significantly over this large range of signal input levels. That is, the final signal output is a faithful reproduction of the signal input while, at the same time, the high-frequency components are pre-emphasized nonlinearly with respect to amplitude at the sending station and de-emphasized nonlinearly in a complementary manner at the receiving station, thus substantially improving the signal-to-noise ratio in the stages following the sending station.

While there have been described what are, at present, considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A wide-band signal-translating channel subject to undesired broad-spectrum noise comprising in cascade, in the order named:

an input circuit for supplying a signal within a given amplitude range comprising components within a wide band of frequencies;

a pre-emphasis circuit coupled to said input circuit and having a frequency-response characteristic accentuating the components of a translated signal as a continuous direct function of their frequencies;

a signal-attenuating circuit coupled to said pre-emphasis circuit and having a nonlinear amplitude-response characteristic over said amplitude range as modified by said pre-emphasis circuit accentuating attenuation of high-frequency signals of high amplitude;

a frequency-discriminating signal-translating circuit coupled to said signal-attenuating circuit having a nonlinear amplitude-response characteristic over the amplitude range of the signals applied thereto accentuating high-frequency signals of high amplitude;

and a de-emphasis circuit coupled to said frequency-discriminating circuit having a frequency-response characteristic which is substantially a continuous inverse function of frequency.

2. A wide-band signal-translating channel subject to undesired broad-spectrum noise comprising in cascade, in the order named:

an input circuit for supplying a signal within a given amplitude range comprising components within a wide band of frequencies;

a pre-emphasis circuit coupled to said input circuit and having a frequency-response characteristic accentuating the components of a translated signal as a continuous direct function of their frequencies;

a signal-attenuating circuit coupled to said pre-emphasis circuit and having a nonlinear amplitude-response characteristic over said amplitude range as modified by said pre-emphasis circuit accentuating attenuation of high-frequency signals of high amplitude;

a frequency-discriminating signal-translating circuit coupled to said signal-attenuating circuit having a non-linear amplitude-response characteristic over the amplitude range of the signals applied thereto substantially complementary to that of said signal-attenuating circuit;

and a de-emphasis circuit coupled to said frequency-discriminating circuit having a frequency-response characteristic substantially complementary to that of said pre-emphasis circuit.

3. A wide-band signal-translating channel subject to undesired broad-spectrum noise comprising:

an input circuit for supplying a signal within a given amplitude range comprising components within a wide band of frequencies;

a pre-emphasis circuit coupled to said input circuit and having a frequency-response characteristic accentuating the high-frequency components of a translated signal including a serially connected capacitance arm followed by a shunt-connected resistance arm;

and a signal-attenuating circuit coupled to said pre-emphasis circuit across the signal-translating channel and including serially connected capacitance means and unbiased resistance means, said capacitance means having a reactance at the lower frequencies of said band substantially higher than the shunt impedance of said pre-emphasis circuit across the channel, one of said means having an impedance varying in value with the voltage applied thereto over said amplitude range as modified by said pre-emphasis circuit.

4. A wide-band signal-translating channel subject to undesired broad-spectrum noise comprising:

an input circuit for supplying a signal within a given amplitude range comprising components within a wide band of frequencies;

a pre-emphasis circuit coupled to said input circuit and having a frequency-response characteristic accentuating the high-frequency components of a translated signal including a serially connected capacitance arm followed by a shunt-connected resistance arm;

and a signal-attenuating circuit coupled to said pre-emphasis circuit across the signal-translating channel and including serially connected capacitance means and unbiased resistance means, said capacitance means having a reactance at the lower frequencies of said band substantially higher than the shunt impedance of said pre-emphasis circuit across the channel, said resistance means varying in value with the voltage applied thereto over said amplitude range as modified by said pre-emphasis circuit.

5. A wide-band signal-translating channel subject to undesired broad-spectrum noise comprising:

an input circuit for supplying a signal within a given amplitude range comprising components within a wide band of frequencies;

a pre-emphasis circuit coupled to said input circuit and having a frequency-response characteristic accentuating the high-frequency components of a translated signal including a serially connected capacitance arm followed by a shunt-connected resistance arm;

and a signal-attenuating circuit coupled to said pre-emphasis circuit across the signal-translating channel and including a capacitor connected in series with a pair of unbiased diode devices connected in parallel with opposite polarity, said capacitance means having a reactance at the lower frequencies of said band substantially higher than the shunt impedance of said pre-emphasis circuit across the channel and each of said diode devices having a nonlinear voltage-resistance characteristic over said amplitude range as modified by said pre-emphasis circuit.

6. A wide-band signal-translating channel subject to understand broad-spectrum noise comprising:

an input circuit for supplying a signal within a given amplitude range comprising components within a wide band of frequencies;

a frequency-discriminating signal-translating circuit coupled to said input circuit across the signal-translating channel, having a nonlinear amplitude-response characteristic over said amplitude range accentuating high--frequency signals of high amplitude and including serially connected capacitance means and unbiased resistance means, said capacitance means having a reactance at the lower frequencies of said band substantially higher than the shunt impedance of said pre-emphasis circuit across the channel, one of said means having an impedance varying in value with the voltage applied thereto over said amplitude range;

and a de-emphasis circuit coupled to said frequency-discriminating circuit and having a frequency-response characteristic which is substantially a continuous inverse function of frequency and including a serially connected resistance arm followed by a shunt-connected capacitance arm.

7. A wide-band signal-translating channel subject to undesired broad-spectrum noise comprising:

an input circuit for supplying a signal within a given amplitude range comprising components within a wide band of frequencies;

a frequency-discriminating signal-translating circuit coupled to said input circuit across the signal-translating channel, having a nonlinear amplitude-response characteristic over said amplitude range accentuating high-frequency signals of high amplitude and including serially connected capacitance means and unbiased resistance means, said capacitance means having a reactance at the lower frequencies of said band substantially higher than the shunt impedance of said high-frequency signals of high amplitude and including pre-emphasis circuit across the channel, said resistance means varying in value with the voltage applied thereto over said amplitude range;

and a de-emphasis circuit coupled to said frequency-discriminating circuit and having a frequency-response characteristic which is substantially a continuous inverse function of frequency and including a serially connected resistance arm followed by a shunt-connected capacitance arm.

8. A wide-band signal-translating channel subject to undesired broad-spectrum noise comprising:

an input circuit for supplying a signal within a given amplitude range comprising components within a wide band of frequencies;

a frequency-discriminating signal-translating circuit coupled to said input circuit across the signal-translating channel, having a nonlinear amplitude-response characteristic over said amplitude range accentuating high-frequency signals of high amplitude and including a capacitor connected in series with a pair of unbiased diode devices connected in parallel with opposite polarity, said capacitance means having a reactance at the lower frequencies of said band substantially higher than the shunt impedance of said pre-emphasis circuit across the channel and each of said diode devices having a nonlinear voltage-resistance characteristic over said amplitude range as modified by said pre-emphasis circuit;

and a de-emphasis circuit coupled to said frequency-discriminating circuit and having a frequency-response characteristic which is substantially a continuous inverse function of frequency and including a serially connected resistance arm followed by a shunt-connected capacitance arm.

References Cited by the Examiner

UNITED STATES PATENTS

| | | | |
|---|---|---|---|
| Re. 24,110 | 1/1956 | Winkler | 332—18 |
| 2,397,157 | 3/1946 | Roberts | 325—46 |
| 3,111,635 | 11/1963 | Skov et al. | 179—1 XR |

KATHLEEN H. CLAFFY, *Primary Examiner.*

R. MURRAY, *Assistant Examiner.*